Patented Nov. 29, 1932

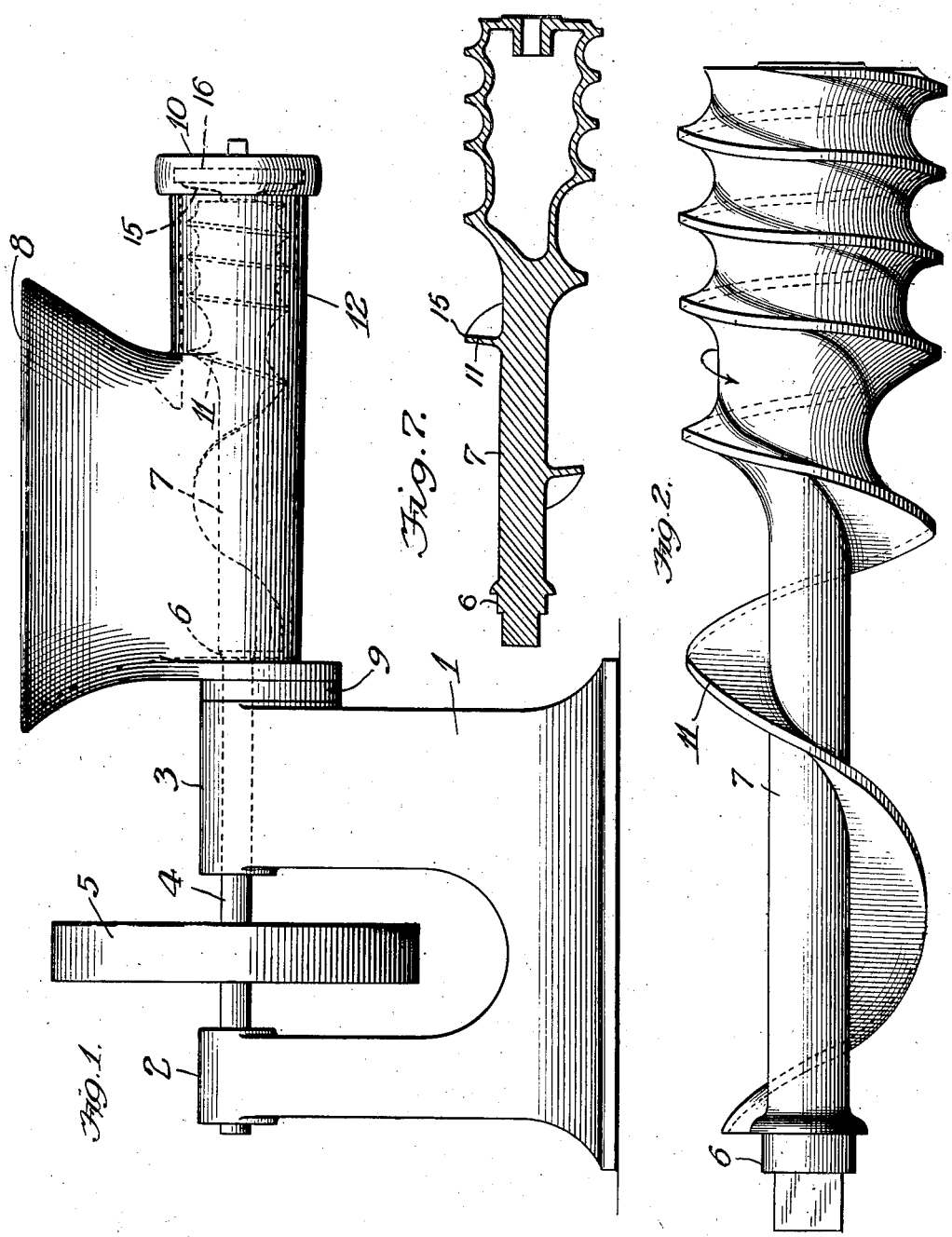

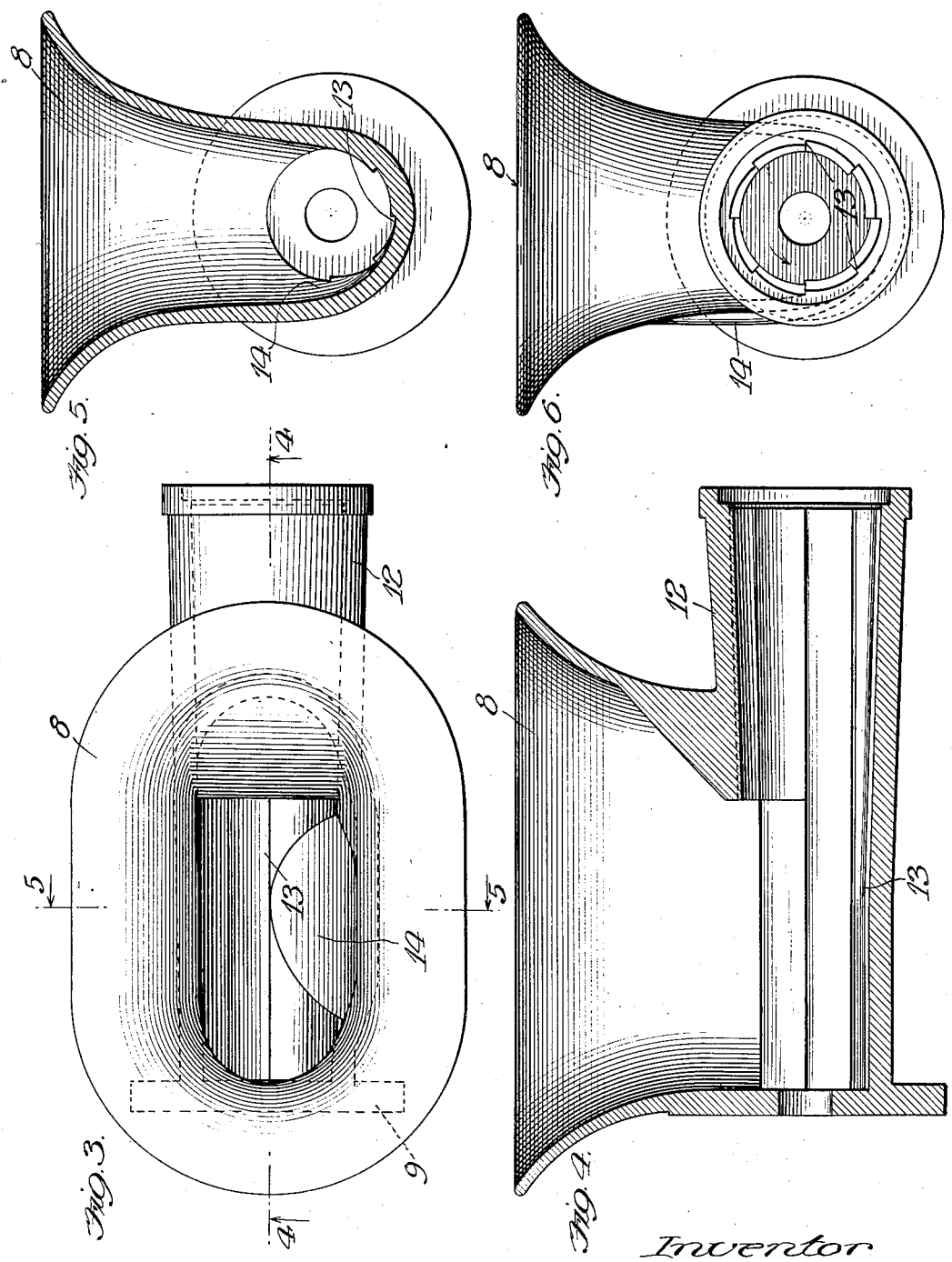

1,889,688

UNITED STATES PATENT OFFICE

THOMAS P. MIDDLETON, OF EAST ST. LOUIS, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

MEAT HASHER

Application filed February 13, 1930. Serial No. 428,205.

This invention relates to meat hashers, and the purposes of the invention are to provide improvements in the construction of meat receiving bowls thereof, and in the feed screw, which make unnecessary any manual or mechanical means for forcing the meat into engagement with the screw; to provide an improved feed screw construction in which the uncovered convolutions of a helical blade are formed to draw meat from a receiving bowl and thrust it inwardly towards the core of the screw for avoiding upward churning of the meat in the receiving bowl and facilitating feeding of the meat to the screw; to provide an improved seal between the receiving bowl and the screw for preventing backward movement of meat under pressure from the enclosed convolutions of the blade; and to provide a cutting edge on the outer periphery of the blade for severing pieces of meat extending from the receiving bowl down between the receiving convolution of the screw.

Figure 1 shows in side elevation the improved meat hasher device.

Fig. 2 is a detail in plan view of the feed worm or screw of the meat hasher.

Fig. 3 is a detail view in plan of the bowl.

Fig. 4 is a longitudinal vertical sectional view of the bowl taken on the line 4—4 of Fig. 3.

Fig. 5 is a transverse vertical sectional view of the bowl taken on the line 5—5 of Fig. 3.

Fig. 6 is an end view of the bowl.

Fig. 7 is a longitudinal vertical section of the construction shown in Fig. 2.

Heretofore the screws used in meat hashers of the class described have been provided with threads having a thick base portion adjacent the core of the screw and forwardly and inwardly inclined propelling sides. Threads of such a construction are suitable for those portions of the screw which are completely enclosed, but when employed on that portion of the screw which registers with the throat of the bowl, they apply some upward thrust on the meat being fed, and cause churning of the meat in the bowl. This action prevents the meat from being freely fed to the screw and as a result the attendant may press the meat down in the bowl by hand. This practice is exceedingly dangerous and frequently results in injury to the workman.

The construction illustrated includes improvements such as a helical blade provided with a meat receiving convolution having its propelling side extending at a rearward and inward inclination to the axis of the core of the screw for drawing the meat received inwardly towards the core. The pitch of the receiving convolution corresponds with the length of the discharge opening in the receiving bowl, in other words the pitch of the receiving convolution equals the length of the discharge opening of the bowl. These features prevent the meat from being thrust outwardly from the core of the screw and provide an unobstructed passage for the meat into the receiving convolution.

Upward churning of the meat in the bowl is avoided and the dangerous practice of manually pressing the meat in the bowl downwardly by hand is not resorted to by the workman.

These improvements are shown in detail in the accompanying drawings wherein the supporting structure is shown as a standard 1 having bearings 2 and 3 for receiving the drive shaft 4. This drive shaft is provided with a drive pulley 5 and as usual is arranged to receive the square end 6 of the feed worm 7. The meat receiving bowl and housing 8 for the worm is secured at its flange end 9 to standard 1 and as usual is provided at its discharge end 10 with means for receiving the meat cutters, one of which is attached to the discharge end of the worm.

The thread or blade 11 of the worm which has a greater pitch at the receiving end than at the discharge end is arranged within the tubular housing 12 formed integral with the bowl 8. The blade 11 inclines forwardly from the shaft which forms the core of the worm towards the discharge end and is disposed at an acute angle to a transversely extending plane which is at right angles to the axis of the worm. In other words, the blade 11 which extends outwardly and forwardly has only a small forward inclination. The said blade 11 is of uniform thickness, or substantially so, from the shaft or core of the worm to the edge of the blade and cross-sectionally straight to present plane faces to the material.

The convolution of the blade having the increased pitch is inclined forwardly and outwardly relative to the core of the screw as shown in Figs. 2 and 7. It will be noted that the slant, slope or inclination of the blade of the receiving convolution of the screw may properly be referred to and described as having an outward and slightly forward inclination or as having what is the same thing an inward and slightly rearward inclination. This construction provides a forwardly and outwardly inclined or undercut propelling face on the receiving convolution of the screw which draws downwardly and inwardly on meat fed into the bowl while feeding the meat toward the portion of the thread of reduced pitch. A cutting edge 15 formed on the outer periphery of the receiving convolution coacts with the edge of the bowl around the opening in severing pieces of meat which extend from the bowl into the receiving convolution. The length of the opening corresponds with, viz. equals, the pitch of the receiving convolution so that only a single convolution of the blade is in registration with the throat of the bowl and thus the passage from the bowl to the space in the receiving convolution is unobstructed.

The internal surface of the bowl including the tubular part 12 thereof, adjacent the worm, is provided with ribs 13, extending in the direction of the axis of the worm and serving to restrain the meat from rotating with the worm while not resisting its travel longitudinally thereof. The bowl is provided with a pocket 14, Figs. 3 and 5, which is free of said ribs at the point where the meat drops downwardly into engagement with the worm so that the meat fed by gravity to the worm may be more easily engaged thereby. The pocket 14 which is substantially segmental, as clearly illustrated in Fig. 3, is formed by bulging the side wall outwardly, as clearly shown in Fig. 6 of the drawings. The pocket 14 tapers downwardly, as shown in Fig. 5 to direct the material toward the worm.

In the operation of the device, the worm is rotated in the direction indicated by the arrows in Fig. 6, and meat fed into the hopper part of the bowl drops into the pocket 14, where it is engaged by the convolution of the screw having the greater pitch and forward inclination and is fed forwardly into engagement with the thread convolutions of decreased pitch and out through the cutting devices indicated as by 15 and 16 in Fig. 1. The ribs 13 prevent undesirable slippage of the meat upwardly into the hopper part of the bowl while also serving to guide the meat longitudinally in the direction in which it is urged by the rotation of the worm.

Although but one specific embodiment of this invention has been herein shown and described, it will be understood that details of the construction shown may be altered or omitted without departing from the spirit of this invention as defined by the following claims.

I claim:—

1. A meat hasher of the class described comprising in associated relationship a bowl having a tubular housing associated therewith and leading therefrom, a worm journaled for rotation within said bowl, and a cutter located at the forward delivery end of the housing, said bowl having a discharge opening or throat leading to a rear section of the worm, the worm consisting of a shaft or core having at the rear receiving section of the worm a receiving convolution that is provided by a spiral blade element which in cross section is straight, is of uniform thickness from the shaft to the peripheral edge of the blade so as to present relatively plane faces to the material being operated upon, and has a rearward and inward inclination, the worm having at the forward delivery end a delivering convolution into which the receiving convolution gradually merges, which delivering convolution has a pitch substantially less than that of the receiving convolution and has a depth less than that of the receiving convolution, and which delivering convolution in cross section gradually increases in thickness in passing inwardly from the outer peripheral edge thereof towards the shaft or core of the worm, the arrangement being such that the initial receiving convolution is provided by said spiral blade which is of uniform cross section, and has a pitch equal to the length of the discharge opening or throat leading to the rear section of the worm.

2. A meat hasher as defined in and by the claim last preceding in which the bowl is constructed so that the forward end of the throat opening is defined by a portion providing at the rear thereof a vertically and transversely extending meat engaging face which in transverse dimension is substantially equal to that of the outside diameter of the worm and which extends into proximity with the outer peripheral portion of the worm, and in which hasher in the worm receiving section of the bowl—except as to the portion of the bowl whereat a receiving pocket is provided at the down side of the worm—and continuing into and along the tubular worm receiving housing there is provided longitudinally extending ribs constructed for restraining the meat from rotation while permitting the meat to travel longitudinally along the ribs.

3. A worm for use in meat hashing machines, which worm is constructed so as to provide a shaft or core having integral therewith a receiving convolution at the rear end portion of the shaft and a discharging convolution at the forward end portion of the shaft, which discharging convolution has, respectively, substantially less pitch and substantially less depth than the receiving convolution, said worm being characterized in that the receiving convolution is provided by a spiral flight or blade which is of substantially equal depth throughout its length which is of substantially straight uniform cross section, and which is of uniform thickness in passing from the shaft on the one hand to the peripheral edge portion of the flight or blade on the other hand, and which uniform cross section and thickness extends throughout the length of the blade, in that the spiral flight or blade of the receiving convolution throughout its entire length in longitudinal section slopes rearwardly and inwardly and whereby along the entire front outer edge of the peripheral portion of the flight there is provided an effective cutting edge, and in that in combination with the receiving convolution thus described and characterized there is employed the delivering convolution into which the receiving convolution gradually merges and in which delivering convolution the thickness of each cross section of the flight portion of the delivering convolution progressively increases in passing inwardly from the peripheral portion thereof.

4. A worm embodying the features of construction as defined in claim 3 further characterized in that while as to the receiving convolution for each cross section thereof the rear and front face elements slant inwardly and slightly rearwardly that as to the delivering convolutions substantially for each cross section thereof the rear face element slants or slopes inwardly and decidedly rearwardly and the front face element slants or slopes inwardly and decidedly forwardly, there being a merging at the forward end of the receiving section and the rear end of the delivering section whereat the front and rear faces of the convolution gradually change to provide an easy slope from one face contour to another.

Signed at East St. Louis this 4th day of February, 1930.

THOMAS P. MIDDLETON.